United States Patent [19]
Trump

[11] 3,916,991
[45] Nov. 4, 1975

[54] HEATING SYSTEM
[76] Inventor: George S. Trump, 6100 Madison St., West New York, N.J. 07093
[22] Filed: Apr. 5, 1974
[21] Appl. No.: 458,105

[52] U.S. Cl. ........... 165/163; 165/DIG. 2; 126/101; 122/20 B
[51] Int. Cl.² .................................. F28D 15/00
[58] Field of Search.... 126/99 A, 99 D, 101, 110 B, 126/108, 109, 117, 116 R, 116 A; 122/169, 244, 5, 247, 20 B; 165/129, 163, 155, 156; 98/45, 46; 237/55, 56, 12.3 B

[56] References Cited
UNITED STATES PATENTS
| | | | |
|---|---|---|---|
| 372,249 | 10/1887 | Blake | 126/101 |
| 1,988,642 | 1/1935 | Wolbers | 165/186 X |
| 2,294,579 | 9/1942 | Sherman | 126/101 |
| 3,198,190 | 8/1965 | Gordon | 126/117 |

Primary Examiner—Charles J. Myhre
Assistant Examiner—T. W. Streule
Attorney, Agent, or Firm—Emanuel R. Posnack; Paul J. Sutton

[57] ABSTRACT

The present invention includes a heating system for use with a primary source of heat, such as a gas hot air furnace, or the like. A first conduit formed with perforations therethrough conveys hot exhaust gases generated by the furnace to a flue. A second conduit carrying a fluid is coiled about the first conduit in close proximity thereto so as to permit a transfer of heat to said fluid from exhaust gases escaping from said perforations and contacting said second conduit. A third conduit houses the first and second conduits and conveys exhaust gases that have escaped through said perforations to the flue. Sleeve means intermediate the first and second conduits control the rate of said heat transfer.

10 Claims, 8 Drawing Figures

HEATING SYSTEM

BACKGROUND OF THE INVENTION

1. The Field of the Invention

The present invention relates generally to heating systems, and is more particularly directed to a heating system capable of cooperatively capturing otherwise wasted heat of exhaust gases generated by a furnace.

2. The Known Art

Considerable attention and much discussion is being given to our national and world energy resources. Problems of fuel and power supply are now the concern of the home owner, the industry executive, as well as many of us who in the past have taken our heating and power supplies for granted. Perhaps a dividend of more recent energy crises has been the resulting reexamination of our energy reserves and the manner in which we presently use and waste energy. It is becoming increasingly obvious that a more efficient use of fuels will help to offset increases in fuel costs and will help to guarantee an unimpeded economic development for a long time to come. Conventional heating equipment has not escaped our scrutiny and it is this field that the present invention serves.

The technical literature is crowded with conventional heating and heat exchanging systems. Industrial heating furnaces, for example, are usually classified according to (1) the purpose for which the material is heated; (2) the nature of the transfer of heat to the material; (3) the method of firing the furnace; or (4) the method of handling material through the furnace. Home heating furnaces, on the other hand, are usually characterized by the fuel consumed and the medium being heated — such as hot air, steam, hot water, etc.. Most furnaces or boilers generate a relatively hot exhaust medium which is ultimately conveyed to the environment or, in the case of more sophisticated systems, to recycling apparatus. In the case of hot exhaust gases, for example, a great deal of energy is wasted or not recaptured by the simple discharge of these gases at elevated temperatures into the atmosphere.

Conventional efforts to reclaim or recycle otherwise lost heat energy are best illustrated in equipment commonly referred to as economizers and air heaters. Economizers serve as traps for removing heat from flue gases and, as the name "economizer" implies, this type of unit is able to yield the user considerable savings in costs of fuel. Economizers are usually found in industrial applications in which they perform as feed water heaters which receive water from boiler feed pumps and deliver it at higher temperatures to steam-generating apparatus. In such conventional units, a forced-flow, convection heat-transfer arrangement consisting of a bank of steel tubes is supplied to feed water at pressures greater than that of a generating section and at a rate commensurate with steam output of the system. Gas flow contacts the external surfaces of these tubes.

Air heaters, like economizers, function as traps to reclaim heat from flue gases, but usually make use of the air that is ultimately used for combustion. Air heaters, by reducing outlet gas temperatures to lower values than is possible with economizers supplied by heated feed water yield a gain in over-all thermal efficiency. These units are usually categorized as being either recuperative or regenerative types. However, both types depend upon a convection transfer of heat from a gas stream to a metal or other solid surface, followed by convection transfer from the solid to the cooling air.

Of course, there are many other types of heat exchangers known to the art which serve to reclaim what would otherwise be lost heat energy, many of which circulate mediums at different temperatures in close enough proximity to one another to permit an exchange of heat therebetween. However, such arrangements and equipment are usually costly to purchase and maintain, rather complex in their structural configuration, and not adaptable for use with both home as well as industrial heating systems.

OBJECTIVES OF THIS INVENTION

It is an object of the present invention to provide a heating system capable of cooperatively deriving its source of heat energy from the exhaust medium generated by an existing heating system.

It is another objective of the present invention to provide both primary and secondary heating systems, wherein the secondary system cooperatively derives its source of heat energy from the exhaust medium generated by the primary system.

Another object of this invention is to provide a novel method and apparatus for transferring heat in a controlled manner.

Yet another object is to provide a means by which to heat otherwise unheated areas of a building or to further heat already heated areas of a building utilizing the existing basic heating system of the building.

A further object of the invention is to provide the user, whether he be a homeowner or an owner of a larger facility, with means by which he can increase the over-all efficiency of his existing heating system at relatively low costs, thereby enabling him to reduce his fuel costs while realizing greater heating system capacity.

Another object is to provide a heating system kit for use with existing heating systems, which will provide the user with the aforementioned benefits.

Still a further object of the invention is to provide a heating system which overcomes the limitations and disadvantages of prior art solutions to problems associated with such heating systems.

SUMMARY OF A PREFERRED EMBODIMENT OF THIS INVENTION

According to a preferred embodiment of the present invention, hot exhaust or flue gases generated by a furnace are conveyed by a first perforated conduit towards a flue. A second fluid-carrying conduit is coiled about the first conduit in relatively close proximity thereto so as to permit gases escaping through the perforations of said first conduit to contact the outer surfaces of the second conduit. Heat is transferred from the exhaust gases through the walls of the second conduit to the fluid therein. This heated fluid is thereafter conveyed to a remote location whereupon it is caused to lose its acquired heat to a space sought to be heated; whereupon it is returned in a substantially closed-loop arrangement to the coiled portion of the second conduit. Exhaust gases that have been permitted or caused to escape from the perforated first conduit are contained by a third conduit which conveys them to the flue and which houses the first conduit and said coiled portions of the second conduit.

The flow pattern of escaping exhaust or flue gases is controlled according to an embodiment of this invention wherein a plurality of spaced sleeve members are positioned intermediate and preferably in contact with one or the other or both of said first conduit and the coiled portion of said second conduit. The presence of these sleeve members over preselected perforations in the first conduit serves to restrict and thus inhibit the flow of exhaust gases through perforations beneath the sleeve members, thereby causing relatively higher flow rates thereof within these restricted areas. The result is a unique flow pattern of gases around the coils. The sleeve members, in addition to causing this flow pattern whereupon the rates of heat transfer as between the exhaust gases and the fluid are controlled, further function as heat "sinks" which hold heat imparted to them by these same gases and conduct same directly into the walls of the second conduit coils.

In other embodiments of the present invention described in detail below, deflecting vanes are provided to yet further alter and control the flow of gases which contact the fluid-carrying coils. In all cases, however, contamination of the fluid by the often impure flue gases is prevented via the presence of closed second conduit system.

As used in this specification, the term "heat" will be used in its broadest sense as energy in transit from one mass to another as a result of a temperature difference between the two. Similarly, the term "heat exchange" or "heat transfer" shall include the propagation of heat: (1) by conduction, wherein heat passes from one part of a body to another in physical contact with it, without displacement of the body's particle makeup; (2) by convection, wherein heat is transferred from one place to another within a fluid (gas or liquid) by mixing one portion of the fluid with another; and (3) by radiation of heat in the form of radiant energy propagated as a wave phenomenon.

DESCRIPTION OF THE DRAWINGS

This invention will be more clearly understood from the following description of the specific embodiments of the invention, together with the accompanying drawings, wherein similar reference characters denote similar elements throughout the several views, and in which.

DESCRIPTION OF THE INVENTION

Figure 1:
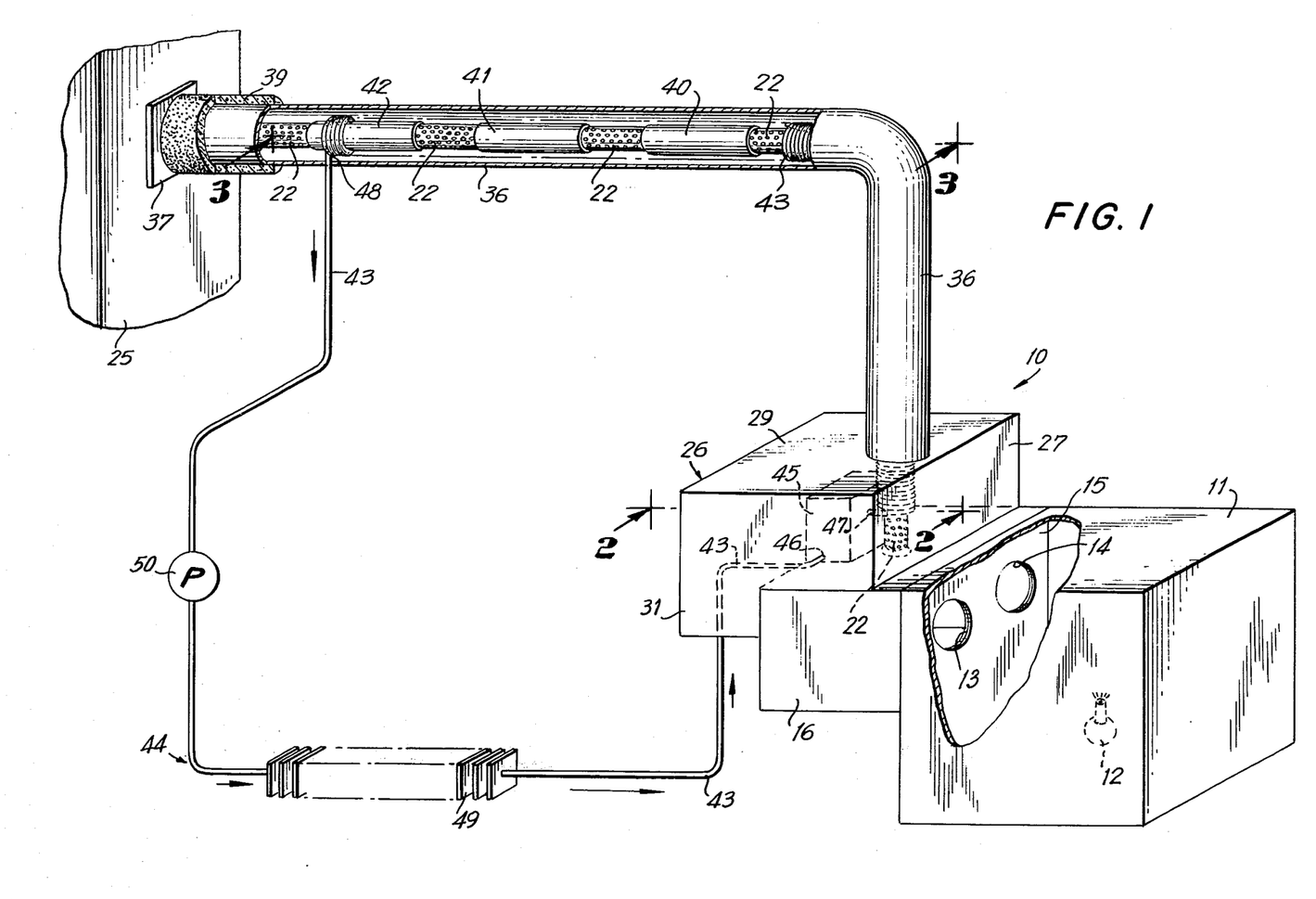
FIG. 1 is a fragmentary, schematic-type perspective view illustrating a heating system according to the present invention.

Referring now in more detail to the drawings, FIG. 1 illustrates a heating system 10 according to the present invention, in a schematic-type representation. A furnace of firebox 11 of the type normally used to heat a private dwelling is schematically shown as a rectangular box in FIG. 1, and may represent any one of a number of different types of furnaces or boilers, such as a gas or oil fired hot air furnace, for example. A burner 12 is shown in phantom outline situated within the base of furnace 11 and located approximately 8 inches above the floor thereof. Natural gas, for example, is consumed in a combustion process which, in turn, generates one or more exhaust gases which leave furnace or firebox 11 through exhaust ports 13 and 14. Exhaust ports 13 and 14 are shown formed through the rear wall 15 of firebox 11 and communicate with a transition box 16 of a conventional type which, in many communities, is supplied by the community Public Service Commission.

Transition box 16 is secured or held to rear wall 15 of firebox 11 by conventional fastening means which do not comprise part of the present invention. Box 16 is formed with a relatively centrally located exhaust opening 17 formed through its top wall 18, best seen in FIG. 2. A fitting 19, itself formed with a central bore 20, overlies exhaust opening 17 and is supported upon top wall 18 such that central bore 20 and exhaust opening 17 are aligned so as to communicate with one another. The interface 21 between the upper surfaces of top wall 18 and the bottom surfaces of fitting 19 is sealed sufficiently well by conventional means so as to prevent exhaust gases which leave transition box 16 through exhaust opening 17 from escaping along interface 21. Substantially all of these exhaust gases which have entered transition box 16 via exhaust ports 13 and 14 leave the transition box through bore 20 of fitting 19.

Figures 2, 3, 4:
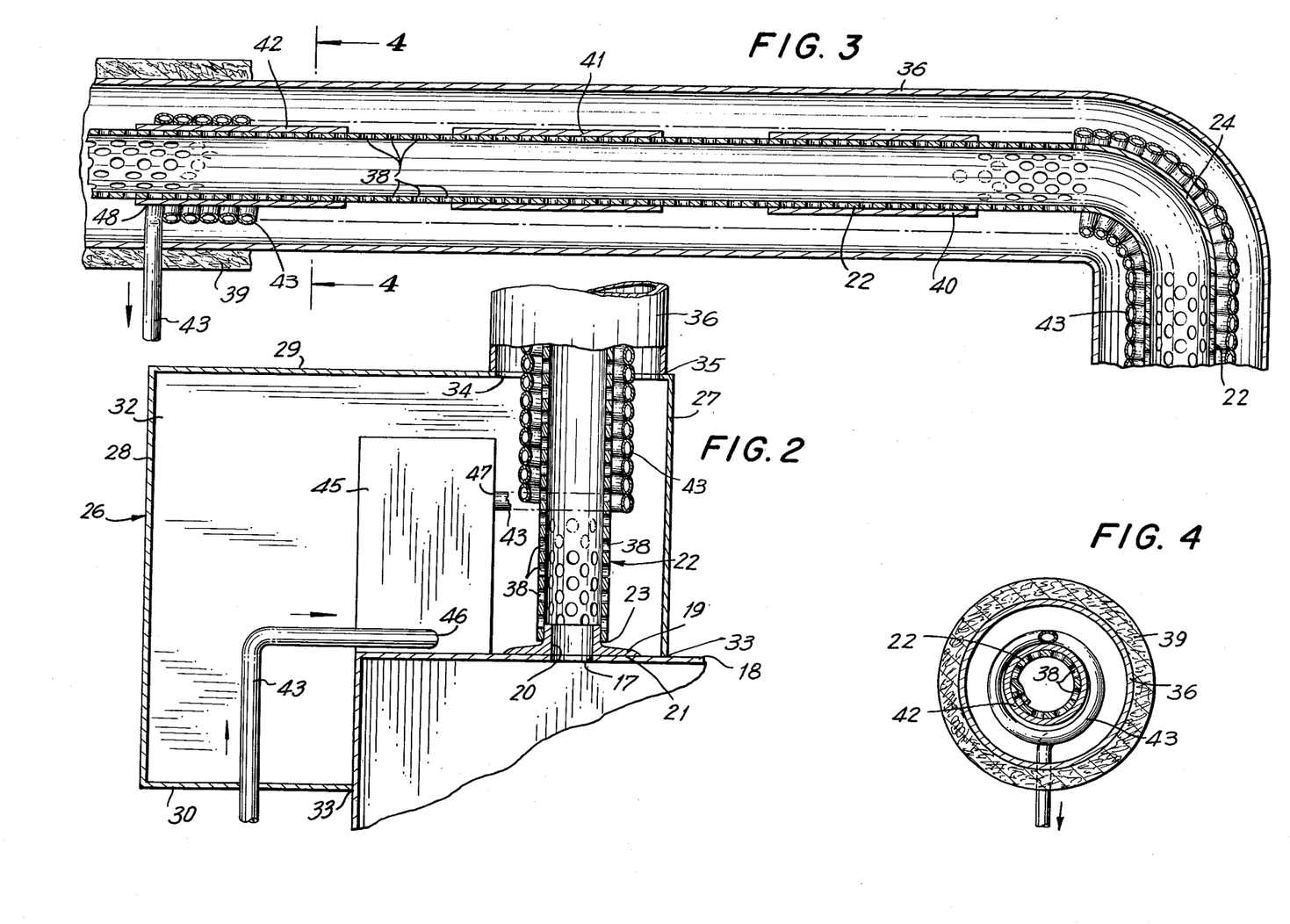
FIG. 2 is a fragmentary, sectional, elevational view looking along the line 2—2 of FIG. 1.
FIG. 3 is a fragmentary, sectional, elevational view looking along line 3—3 of FIG. 1.
FIG. 4 is a fragmentary, sectional, elevational view looking along line 4—4 of FIG. 3.

A perforated pipe 22 is in communicative engagement at a lower end 23 thereof with fitting 19, and extends vertically upwardly from fitting 19 to an elbow 24, best seen in FIG. 3. Elbow 24 may be also be perforated or, on the other hand, may, as shown, consist of a galvanized member. Perforated pipe 22 is preferably made of steel and, as suggested in FIG. 1, extends along a vertical run between fitting 19 and elbow 24 and, thereafter, in a horizontal run between elbow 24 and a flue or chimney 25.

It is worth mentioning here that the presence of an elbow, such as elbow 24, is not at all unusual and in fact is preferred in runs of piping subjected to heat. Such bends facilitate both expansions and contractions of piping during the times when they are both heated and cooled, without inducing undesirable stresses at their extremities where they are supported. A designer skilled in the art will more often than not provide one or more bends in such a line.

Referring once again to FIG. 2, a heat box or bonnet 26 is shown supported atop and partially to the rear of transition box 16. Heat box 26 is formed with forward and rearward walls 27 and 28, respectively, which, in turn, join with upper and lower heat box walls 29 and 30, respectively. Similarly, side walls 31 and 32 join the aforementioned walls 27, 28, 29 and 30 to form the heat box enclosure or bonnet 26 shown in enlarged detail in FIG. 2 as being capable of containing exhaust gases and heat given off by these same exhaust gases. More specifically, the juncture lines or seams 33 formed where heat box walls 27 and 30, for example, meet transition box 16 are preferably but not necessarily gas-tight.

Upper heat box wall 29 is formed with an opening 34 which communicates with and is sealed by the lower end 35 of an outer pipe 36. As shown in FIGS. 1–3, outer pipe 36 extends along a path which is substantially but not necessarily coaxial with respect to the path of perforated pipe 22 to flue or chimney 25 to which outer pipe 36 is secured with the aid of mounting plate 37. As can be seen from the drawings, the use of a perforated pipe 22 to convey exhaust gases from heat box 26 to flue 25 will result in the escape of predetermined quantities of these exhaust gases through the perforations 38 in pipe 22. One of the purposes of the presence of outer pipe 36 is to both contain and convey these escaped gases, which will be further described below, to flue or chimney 25. FIGS. 1 and 3 further illustrate the presence of conventional insulation 39 which, while preferred, is in no way necessary for the present invention to fully operate according to its intended functions.

In the portion of the run of perforated pipe 22 where it extends in a substantially horizontal path between elbow 24 and flue 25, a plurality of sleeve members, the number of which depends upon the length of the run of perforated pipe 22, encircled perforated pipe 22 at spaced locations. FIGS. 1 and 3 illustrate sleeve members 40, 41 and 42 as being spaced from one another such that this gap between adjacent sleeve members extends for a distance of approximately one-half the length of the sleeve members themselves. In other words, for a plurality of sleeve members which are 18 inches in length each, the distance between the sleeve members along perforated pipe 22 is preferably approximately 9 inches. Of course, sleeve members 40, 41 and 42 may be of varying lengths and the spacing between these sleeve members may also vary without departing from the scope or spirit of the present invention.

While not specifically shown in the drawings, a gap between the inner surfaces of sleeve members 40, 41 and 42 and the outer surfaces of perforated pipe 22 may exist and may amount to ¼ inch to ½ inch. Thus, exhaust gases which will escape through perforations 38 will be relatively more inhibited from escaping in those areas of perforated pipe 22 over which a sleeve member is located. On the other hand, exhaust gases may escape more freely from perforations 38 formed through the walls of perforated pipe 22 in those areas in which there are no sleeve members present. Exhaust gases escaping from perforated pipe 22 and contacting any one or more of sleeve members 40, 41 and 42 will transfer heat held by the exhaust gases directly to the sleeve members which, in turn, will transfer this heat to coiled fluid-carrying tubing 43, to be described now below.

A distinct, closed-loop water system 44 is shown in FIG. 1 to consist of a run of preferably ½ inch diameter copper tubing 43 which extends in a unique configuration. FIGS. 1 and 2 illustrate tubing 43 entering heat box 26 through lower wall 30 thereof and thereafter joining and communicating with a reservoir tank 45. Tank 45 contains a predetermined quantity of fluid carried by tubing 43 of closed-loop system 44 - preferably water. Tank 45 is supported by and sits atop top wall 18 of heat box 26 in relatively close proximity to perforated pipe 22. Tubing 43 enters reservoir tank 45 to a point designated numeral 46 in FIG. 2. The arrows adjacent tubing 43 in FIGS. 1 and 2 indicate the direction of flow of fluid within tubing 43, induced by means to be described in more detail below. Tubing 43 leaves reservoir tank 45 at a point 47 spaced from point 46 and thereafter extends in a helically coiled configuration about perforated pipe 22. This coiled configuration of tubing 43 continues from point 47 where the tubing leaves reservoir tank 45, along the path followed by perforated pipe 22 to a point 48 located along the horizontal run of perforated pipe 22. At point 48, tubing 43 leaves its coiled configuration and exits through outer pipe 36 and its covering insulation 39 to a preselected path to a location remote from perforated pipe 22. This remote location may be a room which the user of the present invention desires to heat and, accordingly, a hot water baseboard radiator-type heater 49 is shown schematically in FIG. 1 as being interconnected with tubing 43. A circulator or pump, preferably located between point 48 and radiator 49 pulls fluid carried by tubing 43 along the closed-loop path defined by tubing 43 and making up the system 44. The exact location of circulator 50 is not essential for the present invention to properly function and, accordingly, it is within the scope of the present invention to physically locate circulator 50 at other points in the path followed by tubing 43. Fluid leaving radiator 49 and carried by tubing 43 enters heat box 26 at a point already described in defining this system.

In the embodiment of the present invention illustrated in FIGS. 1–4, the coils defined by tubing 43 as it rises from point 47 about perforated pipe 22 toward elbow 24 extend along an axis which substantially coincides with the axis of perforated pipe 22. This is generally true until this coiled configuration reaches elbow 24 whereupon the weight of the coiled configuration results in the upper portions of this helical coil resting upon and being supported by the uppermost surfaces of sleeve members 40, 41 and 42, as best seen in FIGS. 3 and 4. Thus, the coiled configuration of tubing 43 is supported by these sleeve members along the horizontal run of perforated pipe 22, while the interconnection of tubing 43 with reservoir tank 45 at point 47 provides a means of supporting the vertical extension of this coiled configuration of tubing 43 along the path from point 47 to elbow 24. No other brackets or means of support are required. The helical path followed by the coiled configuration of tubing 43 is such that these coils are not relatively tightly wound or in such close contact with one another as to prevent the passage of gas between and about the respective coils of this configuration.

In operation, exhaust gases generated by the combustion process within furnace 11 may reach 750°F. once the pilot flame initiates this combustion process. A control system, not shown in the drawings, permits the furnace or boiler to operate and consume fuel such as gas or oil for a period of preferably and approximately 17 minutes, for example, before the operation of circulator 50 is initiated. During this initial 17 minute start-up period, exhaust gases generated by the combustion process within furnace 11 leave the furnace through exhaust ports 13 and 14 and, after entering transition box 16, leave this transition box through exhaust opening 17 and thereafter through the bore 20 of fitting 19 so as to enter perforated pipe 22. These exhaust gases heat up transition box 16 and, after entering perforated pipe 22, leave pipe 22 through perforations 38 in predetermined quantities such that these leaving or escaping gases are permitted or caused to circulate within heat box 26, thereby imparting the heat energy carried by these exhaust gases to heat box 26 and the various elements contained or located therein. Again, during this 17 minute start-up period, the result of the entry of hot exhaust gases into heat box 26 is a heating of the fluid or water within reservoir tank 45. This may be accurately described as pre-heating of this fluid. In addition to escaping in predetermined quantities into heat box 26, these hot exhaust gases generated within furnace 11 are conveyed in predetermined quantities through perforated pipe 22 to and toward flue or chimney 25. However, during this conveyance of exhaust gases within perforated pipe 22 toward chimney 25, predetermined quantities of these exhaust gases are caused or permitted to escape through perforations 38 at many points along the way such that these escaping gases impinge upon and come into contact with the coiled configuration of tubing 43, the sleeve members 40, 41 and 42, and the inner walls of outer pipe 36. Exhaust gases that have not escaped through perforations 38 in perforated pipe 22 find their way to chimney 25 whereupon they are ejected as effluent through a stack of a conventional design. Exhaust gases that have escaped from perforated pipe 22 are prevented from entering the environment within which this equipment is located by means of outer pipe 36, which both contain these exhaust gases and likewise conveys them to this same chimney or flue 25.

Once the start-up or initial predetermined and preselected period, such as 17 minutes, has expired, circulator 50 starts up and a controlled flow of fluid such as water within and through tubing 43, reservoir tank 45, the coiled configuration of tubing 43, and radiator 49 is begun and continued. The result is a conveyance of fluid that has been heated within the confines of outer pipe 36 to remote radiator 49, whereupon the heat acquired by the fluid within the confines of outer pipe 36 is transferred to the space surrounding radiator 49 and desired to be heated by the user of the present invention. While a radiator 49 has been described as the means by which this acquired heat is added to space desired to be heated, the present invention contemplates other types of heat exchanging devices to be utilized in place of radiator 49.

A primary objective of the structure just described is to facilitate an efficient and controlled heating of the fluid or water carried by tubing 43. We have already seen how the presence of reservoir tank 45 enables a pre-heating of this fluid such that, once circulation within tubing 43 is initiated after the predetermined start-up period, a quantity of fluid within the closed system 44 has already been raised to pre-heat temperatures. However, both prior to and after the commencement of circulation within system 44 as a result of the actuation of circulator or pump 50, a unique gas flow pattern is achieved as a result of the combination of perforations 38 formed through the walls of perforated pipe 22, the presence and disposition of sleeve members 40, 41 and 42, the proximate location of the coiled configuration of tubing 43 about and in preselected contact with sleeve members 40, 41 and 42, and the presence of a preselected gap between these sleeve members and the outer surfaces of perforated pipe 22. These features, combined with the presence of an outer pipe 36, result in a flow pattern and transfer of heat from the exhaust gases to the fluid within tubing 43 in a controlled manner. Otherwise stated, the rate of the transfer of heat from the exhaust gases to the fluid within tubing 43 is controlled and can be varied via altering the sizes, disposition and arrangement of the structural elements just described. It must also be emphasized here that while FIG. 1 illustrates a run of perforated pipe 22 and its surrounding coiled configuration of tubing 43 as being spaced from and leading to chimney or flue 25, it is well within the scope of the present invention to utilize the flue or chimney 25 itself as an outer piping within which the coiled configuration of tubing 43 and a run of perforated pipe 22 is housed and located. In such a variation, fluid or water within tubing 43 may be heated within the chimney itself.

Looking now at the flow pattern of exhaust gases escaping from perforated pipe 22 on their path toward chimney 25, it can be seen in the vertical run of perforated pipe 22 shown in FIG. 2 that exhaust gases escaping from perforations 38 will both fill the space defined by heat box 26 and will also circulate within, between and about the vertical rise of the coiled configuration of tubing 43. Thus, the heat from these escaping exhaust gases will be transmitted or transferred to the fluid carried by tubing 43 as a result of heat being transferred through the walls of tubing 43 to this fluid or water.

In the case of the horizontal run of perforated pipe 22 illustrated in FIG. 3, escaping gases emerging from perforations 38 will contact and impinge directly upon the coiled configuration of tubing 43 in those areas where there is no sleeve member present. However, at the locations where sleeve members 40, 41 or 42 encircle perforated pipe 22, the otherwise freer flow of escaping exhaust gases is relatively inhibited such that substantially higher velocities of these exhaust gases are achieved as a result of the venturi-type effect resulted from the presence of restricted paths within which these escaping exhaust gases are permitted to flow. The result is a controlled but uneven flow pattern along different points of the run of perforated pipe 22 such that a predetermined and controlled turbulence further enhances the transfers of heat sought to be achieved by the present invention. As already stated, heat acquired by the sleeve members 40, 41 and 42 from these escaping exhaust gases is transferred by direct conduction at their upper extremities through the contacting walls of the coiled configuration of tubing 43. Beneath the sleeve members just described, the space between these sleeve members and the coiled configuration permits a transfer heat due to convective effects utilizing the exhaust gas medium itself to transfer this heat to the fluid carried by tubing 43.

Figures 5, 6, 7:
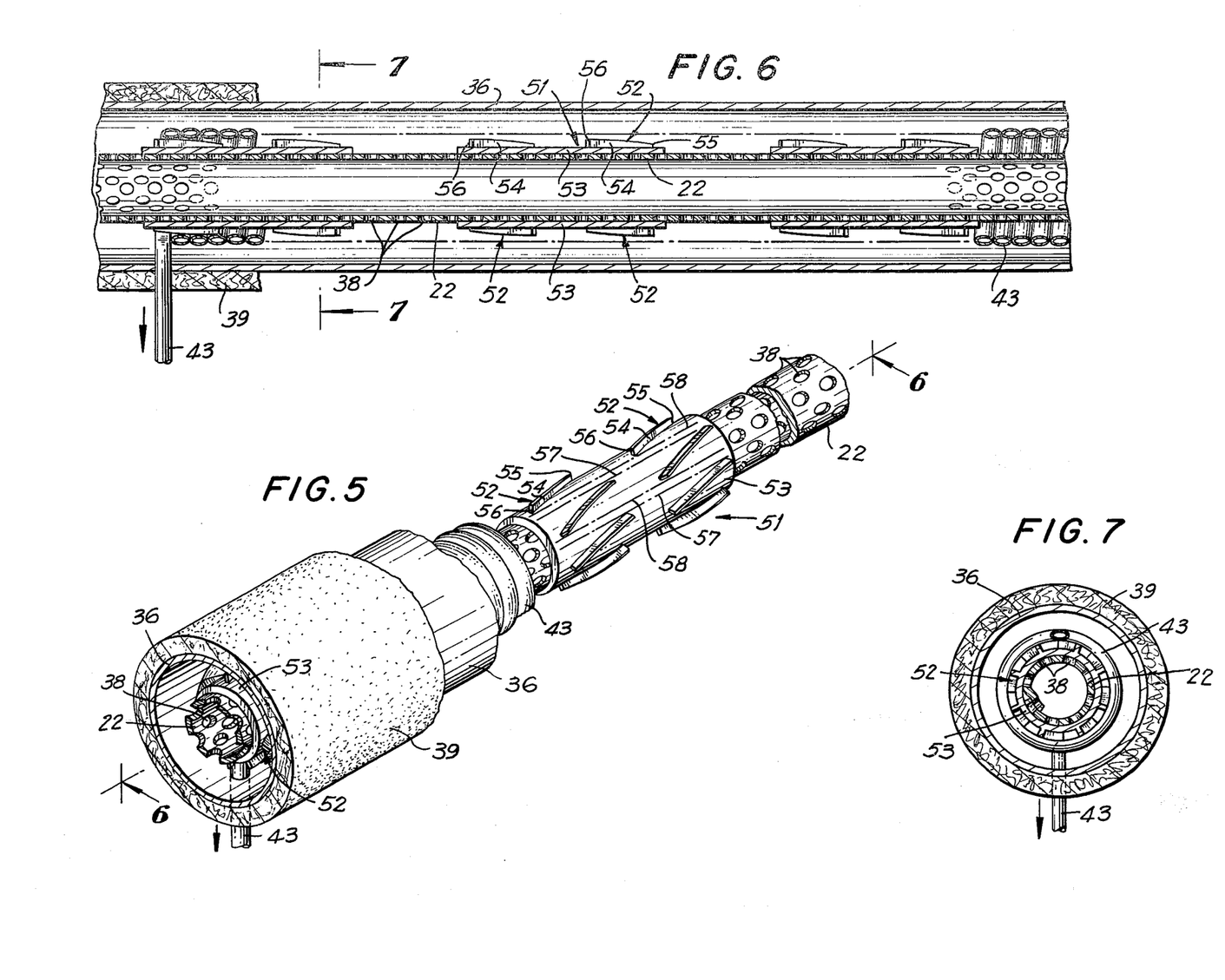
FIG. 5 is a fragmentary, cut-away perspective view illustrating the disposition of elements of another embodiment of the heating system according to the present invention.
FIG. 6 is a fragmentary, sectional, elevational view similar to that of FIG. 3, but illustrating the embodiments of the heating system shown in FIG. 5.
FIG. 7 is a fragmentary, sectional elevational view looking along line 7—7 of FIG. 6.

The present invention contemplates a yet further controlled flow of the escaping exhaust gases once they have emerged from perforations 38 in perforated pipe 22. This further control is illustrated in FIGS. 5–7 wherein a modified form of sleeve member according to this invention is utilized. For purposes of clarity and convenience of description, common reference characters and numerals have been used in FIGS. 5–7 on all elements of the present invention which are common or substantially identical to those already described for FIGS. 1–4. Such is the case, for example, with perforated pipe 22, tubing 43, outer pipe 36, insulation 39, and perforations 38 formed through the walls of perforated pipe 22. A primary distinction between the embodiment of the present invention illustrated in FIG. 3, for example, and that illustrated in FIGS. 5–7, resides in the utilization of a unique sleeve member assembly 51, three of which are illustrated along the horizontal run of perforated pipe 22 shown in FIG. 6. Reference numeral 51, for purposes of convenience, has been used to designate each of these three sleeve member assemblies.

A principal distinction between the sleeve member assembly 51 illustrated in FIGS. 5 and 6, for example, and each sleeve member 40 or 41 or 42, exists in the presence of a plurality of spaced vanes 52, each of which extends or projects outwardly from a sleeve base 53 of sleeve member assembly 51. Sleeve base 53 substantially corresponds to the structural configuration of any one of sleeve members 40, 41 or 42. Vanes 52 are oriented on sleeve base 53 in such a manner that their lateral surfaces 54 are curved between their respective lead ends 55 and their trailing ends 56. In the embodiment shown in FIG. 5, two annularly extending rows of vanes 52 are located about sleeve base 53 in such a manner that adjacent vanes 52 within these rows are situated with their respective lead ends 55 somewhat aligned along a reference line designated numeral 57 in FIG. 5. Similarly, the adjacent vanes within the two rows of vanes just described are located such that their trailing ends are somewhat aligned along another reference line designated numeral 58. It should be noted from FIG. 5 that reference lines 57 and 58, in each instance where they extend between the aligned lead ends 55 and trailing ends 56 of adjacent vanes 52 within the two rows of vanes 52 just described are spaced from one another a finite and predetermined distance. The distance between reference lines 57 and 58 defines a clearance path along which exhaust gases that have escaped from perforations 38 of perforated pipe 22 upstream of sleeve member assembly 51 may pass without interference with one or more vanes 52. Other quantities of exhaust gases, however, will contact or impinge upon curved vanes 52 and will be deflected along the lateral surfaces of these vanes 52 such that a controlled rotational flow of exhaust gases will be maintained in the areas immediate adjacent sleeve member assemblies 51. The presence of the clearance defined by the space between reference lines 57 and 58 provides assurance that undesirable pressure drops as a result of interference will not occur. In this way, the flow of exhaust gases will be controlled but not obstructed.

In addition to providing the desired flow pattern just described, vanes 52 located on sleeve bases 53, further provide means of positively locating and supporting the coiled configuration of tubing 43 along the horizontal run of perforated pipe 22. This is apparent when viewing FIGS. 6 and 7 of the drawings. It can be seen in FIG. 6 that the presence of vanes 52, which are preferably of substantially uniform height, provides a relatively coaxial alignment between the coiled configuration of tubing 43 and the respective perforated pipe 22, the sleeve bases 53, and outer pipe 36. It should be noted here, however, that this coaxial alignment is not necessary for the present invention to perform and function according to its intended purposes.

Figure 8:
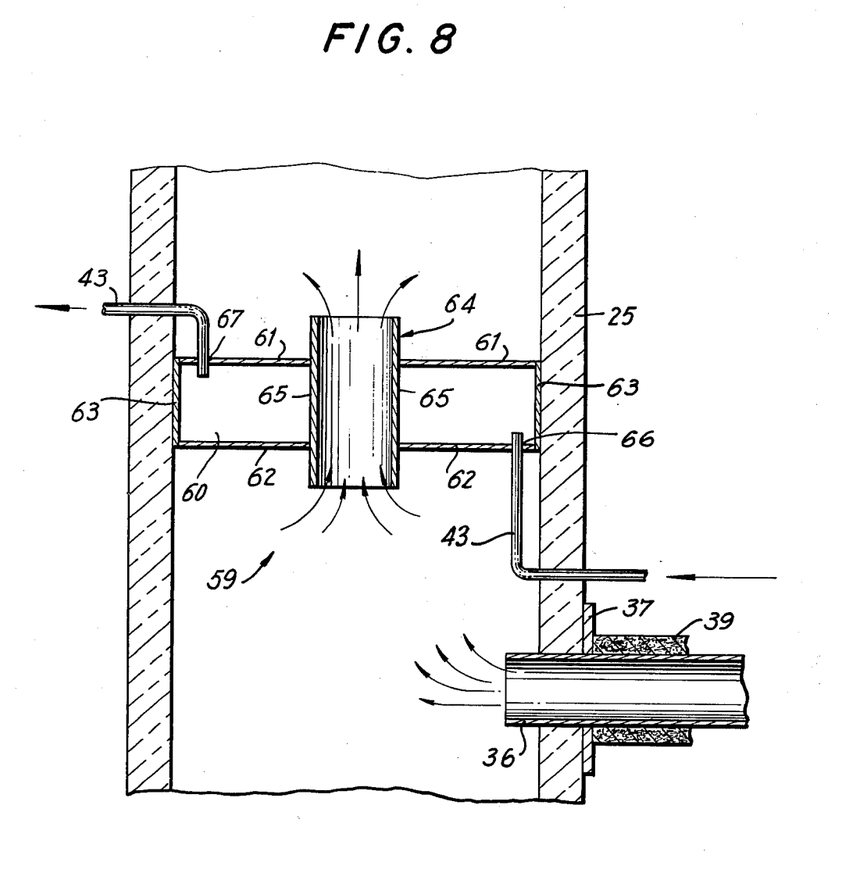
FIG. 8 is a fragmentary, sectional, elevational view illustrating an embodiment of the present invention wherein parts of a chimney or flue are utilized as part of the heating system.

Looking now at FIG. 8, another modification or variation of the present invention is illustrated wherein a chimney installation 59 is shown. Chimney installation 59 is illustrated both as an additional feature of the present invention that can be added to the elements of this heating system already described, or may be substituted for one or more of the combinations previously referred to in connection with the description of FIGS. 1–7. A fluid or water chamber 60 if formed by upper and lower plates 61 and 62, respectively, which join at their outer extremities an annular plate 63 which, in turn, abuts the inner walls of flue or chimney 25. A centrally located duct member 64 is located such that upper and lower plates 61 and 62 join the outer surfaces 65 of duct member 64 in a fluid-tight seal, thereby defining annular fluid chamber 60. The size of fluid chamber 60 and, for that matter, that of the entire chimney installation 59, may vary according to the size of chimney 25 and other variables.

Tubing 43, corresponding to the tubing 43 already described for FIGS. 1–7, is shown entering fluid chamber 60 at point 66 and leaving annular fluid chamber 60 at point 67. The arrows shown in FIG. 8 indicate the preferred direction of fluid flow within tubing 43, thereafter into annular chamber 60 and yet thereafter out from annular fluid chamber 60.

In one embodiment of this invention, exhaust gases carried by both perforated pipe 22 and outer pipe 36 are discharged into chimney 25 below chimney installation 59. The result is a heating of fluid within annular fluid chamber 60 by hot exhaust gases coming into contact with lower plate 62 prior to leaving this area through duct member 64. Additional heat is supplied to fluid within fluid chamber 60 through the walls of duct member 64 and as a result of radiation and convection effects. This fluid which has acquired heat from the exhaust gases and which is located within annular fluid chamber 60 is conveyed by means of tubing 43 to a radiator, of the type described for radiator 49, or to any other preselected location.

It is possible for chimney installation 59 to replace the coiled configuration of tubing 43, should that be desired, or it is also possible for chimney installation 59 to augment the coiled configuration already described for FIGS. 1–7.

The inside diameter of duct member 64 is sized so as to minimize any adverse effects upon the stack effect sought to be achieved by conventional stack means associated with flue or chimney 25. To aid the reader, the term "stack effect" as used in this specification, refers to the phenomenon caused by differences in density between vertical columns of gases which, in turn, results from differences in temperature. For a chimney or stack, this relation exists between the confined hot gases and the cooler surrounding air, with equal or balanced static pressure occurring at the top or free outlet of the chimney or stack. The magnitude of stack effect, which will vary with height and mean temperature of the columns, can be predetermined from conventional emperical and analytical data. This magnitude will indicate the static draft produced by a stack. When flow occurs, such as the flow of exhaust gases within chimney 25, a portion of the differential is used to establish gas velocity when making computations, and the remainder is used to overcome resistance of the connected system, such as resistance caused by the presence of chimney installation 59. This illustrates the ease by which the sizing of chimney installation 59 and duct member 64 may be achieved.

In applications wherein a gas hot air furnace is used with the present invention, chimney temperatures of 400°F. and slightly above will occur. Water or fluid heated within tubing 43 has and can be raised to temperatures exceeding 180°F. without any problems. Yet higher temperatures can be achieved when utilizing an oil burner, for example, wherein exhaust temperatures of 750 degrees Fahrenheit are normal.

Several features of the present invention which may or not be apparent to the reader are worth mentioning at this point in this specification. What were previously unheated portions of a room or building or facility may be heated with the aid of the present invention. Air drafts in hallways, for example, may also be heated by means of this invention. The overall efficiency of the system further provides an opportunity to reduce or minimize the costs of fuel required to heat any given space.

In all of the embodiments described in more detail above, the perforated pipe 22 is preferably made from steel with a thickness of approximately 26 gauge. This perforated pipe is designed to maintain at least a 4 inch inside diameter such that various Public Service Commission requirements are satisfied in various territories throughout the country. Of course, it is obvious and within the scope of this invention to provide a perforated pipe of a different thickness, of a different material, and of a different diameter. In all cases, the use of perforated pipe 22 with either a sleeve member or a sleeve member assembly provides a controlled confinement of gases as their flow is regulated through perforated pipe 22 and through perforations 38 formed in perforated pipe 22. The amount of heat exposed to the coiled configuration of tubing 43 is regulated or controlled. The velocity of escaping exhaust gases will vary at different locations and the vanes 52 illustrated for the embodiment of this invention in FIGS. 5–7, provide yet further means of spacing the coiled configuration of tubing 43 from perforated pipe 22, as well as causing positive flow patterns which serve to distribute the heat of the escaping exhaust gases in a predetermined and more efficient manner.

A separate control system is contemplated by this invention wherein a thermostatic switch (not shown) will initiate the operation of circulator 50, thereby providing a start-up and pre-heat time. This pre-heating of the fluid within tubing 43, such as via provision of reservoir tank 45, does away with undesirable condensation that might occur under conditions of certain temperature differentials. Similarly, such a control means may provide a 10 minute or other period delay between the time that the furnace 11 ceases to operate and the time that the circulator 50 ceases operation. It is contemplated that the circulator will cease operation once fluid within tubing 43 reaches a temperature of 130°F.

The embodiments of the present invention, particularly disclosed and described, are presented merely as examples of the invention. Other embodiments, forms and modifications of this invention coming within the proper scope and spirit of the appended claims will, of course, readily suggest themselves to those skilled in the art.

What is claimed is:

1. A heating system for use with a primary source of heat such as hot gas generated by a furnace, or the like, comprising: first conduit means communicating with said primary source of heat for conducting exhaust gas generated by said primary source of heat toward an exhaust direction; second conduit means disposed proximate portions of said first conduit means for conducting a fluid from said points of proximity to a point substantially remote therefrom; means for causing predetermined quantities of said exhaust gas to escape from said first conduit means and to contact said second conduit means, thereby permitting an exchange of heat to occur as between said exhaust gas and said fluid; and third conduit means housing portions of said first and second conduit means for conveying spaced exhaust gas toward said exhaust direction, said first conduit means comprising a first conduit member formed with perforations through portions thereof and communicating at a first end thereof to an outlet port of a furnace, an opposite second end of said first conduit member communicating with an exhaust flue, said second conduit means comprising a second conduit member disposed in substantially coiled configuration about and proximate said perforations of said first conduit member, and said heating system further comprising at least one sleeve member disposed intermediate said perforations and said second conduit member, said sleeve member being in contact with said second conduit member such that heat energy carried by said exhaust gas escaping through said perforations is capable of reaching said second conduit member and said fluid therewithin by both convection and conduction through said sleeve, said perforations comprising said means for causing predetermined quantities of said exhaust gas to escape.

2. A heating system according to claim 1, further comprising a fluid reservoir disposed proximate said first conduit means and communicating with said second conduit means.

3. A heating system according to claim 1, wherein said sleeve comprises means for influencing the rate of said heat transfer from said exhaust gas to said fluid.

4. A heating system according to claim 1, wherein said sleeve comprises barrier means disposed adjacent said plurality of perforations for interrupting the flow of escaping exhaust gas therethrough.

5. A heating system according to claim 1, wherein said second conduit means extends in a substantially coiled configuration about a predetermined length of said first conduit means.

6. A heating system according to claim 5, further comprising a fluid reservoir disposed proximate said first conduit means, said second conduit means communicating at a first end thereof with a first portion of said fluid reservoir and at a second end thereof to a second portion of said fluid reservoir, said second conduit means further communicating with a remotely disposed heat transfer along its length.

7. A heating system according to claim 6, wherein said heat transfer means comprises a device for transferring heat acquired by said fluid from said exhaust gas to an environment.

8. A heating system according to claim 4, wherein said barrier means comprises a plurality of sleeves spaced from one another.

9. A heating system according to claim 8, further comprising vane means integral with said sleeve member for diverting the flow of escaping exhaust gas.

10. A supplementary heating system for use with existing heat generating apparatus of the type which discharges exhaust gas or the like, comprising: first conduit means communicating with said primary source of heat for conducting exhaust gas generated by said apparatus toward an exhaust direction, second conduit means disposed proximate portions of said first conduit means for conducting a fluid from said points of proximity to a point substantially remote therefrom, means for causing predetermined quantities of said exhaust gas to escape from said first conduit means and to contact said second conduit means, thereby permitting an exchange of heat to occur as between said exhaust gas and said fluid; and third conduit means housing portions of said first and second conduit means for conveying escaped exhaust gas toward said exhaust direction, said first conduit means comprising a first conduit member formed with perforations through portions thereof and communicating at a first end thereof to an outlet port of a furnace, an opposite second end of said first conduit member communicating with an exhaust flue, said second conduit means comprising a second conduit member disposed in substantially coiled configuration about and proximate said perforations of said first conduit member, and said heating system further comprising at least one sleeve member disposed intermediate said perforations and said second conduit member, said sleeve member being in contact with said second conduit member such that heat energy carried by said exhaust gas escaping through said perforations is capable of reaching said second conduit member and said fluid therewithin by both convection and conduction through said sleeve, said perforations comprising said means for causing predetermined quantities of said exhaust gas to escape.

* * * * *